United States Patent

Weinstein et al.

[11] 3,826,142
[45] July 30, 1974

[54] THERMOMETER PACKAGE
[75] Inventors: Berel Weinstein, Sparta; Jimmie D. Scott, Parsippany, both of N.J.
[73] Assignee: Bio-Medical Sciences Incorporated, Fairfield, N.J.
[22] Filed: Jan. 12, 1973
[21] Appl. No.: 323,301

[52] U.S. Cl. .................. 73/356, 73/358, 116/114.5
[51] Int. Cl. ............................................ G01k 11/08
[58] Field of Search ................. 73/356, 358, 150 A; 116/114.5

[56] References Cited
UNITED STATES PATENTS
3,524,345  8/1970  Isaacson ........................... 73/150 A
3,712,141  1/1973  Chadha ............................... 73/356

Primary Examiner—Richard C. Queisser
Assistant Examiner—Denis E. Corr
Attorney, Agent, or Firm—Bruce M. Collins

[57] ABSTRACT

There is disclosed a sterile thermometer and package for the same in which the thermometer is provided with shield components to maintain the thermometer operative temperature indicating component out of contact until the thermometer is required for use, with the thermometer further having a removal roller associated with the shield components and operative to facilitate the ease with which the shield components are removed from the thermometer concurrent with removal of the latter from the package envelope.

6 Claims, 5 Drawing Figures

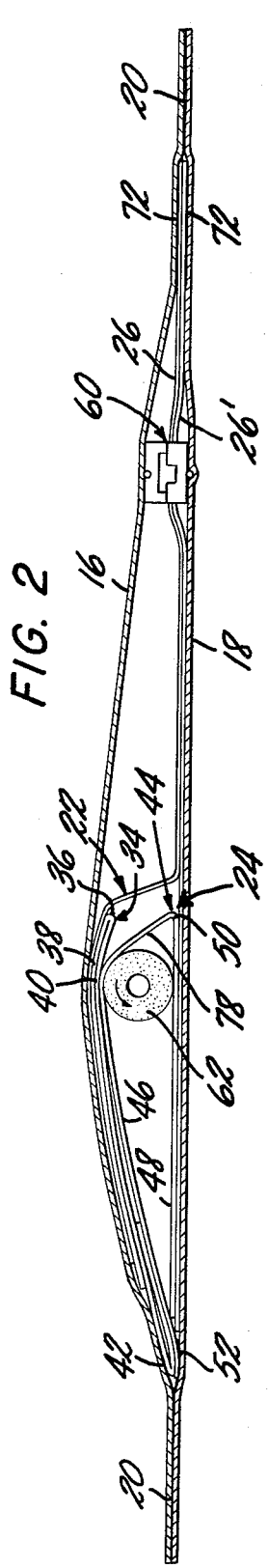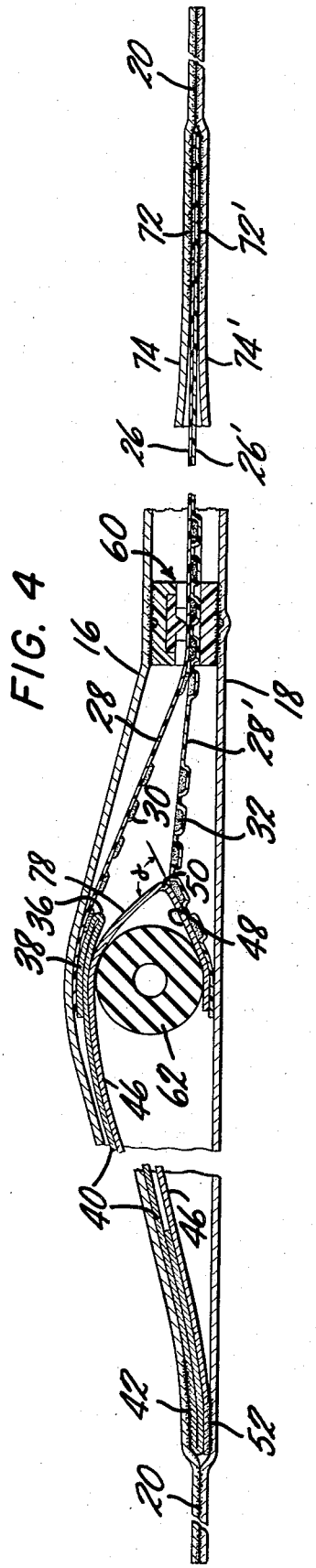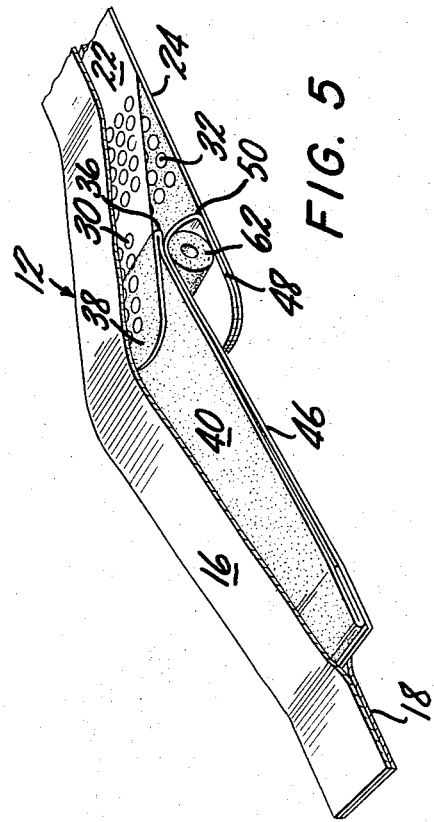

THERMOMETER PACKAGE

BACKGROUND OF THE INVENTION

U.S. Pat. No. 3,665,770 describes a generally flat disposable type thermometer which is comprised of a thermally conductive sheet, such as a foil of aluminum in which is formed a number of cavities, each being filled with a thermally responsive substance provided in such composition as permit for change of the substance from solid to liquid state in graduated sequence responsive to the temperature of the subject being tested. One such substance is for example a solid solution comprised of orthochloronitrobenzene and orthobromonitrobenzene. Also provided in that thermometer is an indicator means in suitable form, such as a dyestuff, which upon melting of the thermally responsive substance in the respective cavities, cooperates with an acceptor, as by migration thereto, to indicate visually, by change of color of the acceptor, a precise condition of temperature associated with each cavity. U.S. Pat. Nos. 3,677,088 and 3,712,414 describe forms of a separator shield for embodiment in the thermometer which, during the manufacture of the thermometer, is removably inserted between the thermally responsive substance and the indicator means to bar communication therebetween until the thermometer actually is to be used, and further to enhance the storage or shelf life of the thermometer. Such shields as are described in said patents are made of materials compatible with the thermally responsive substance as well as the indicator means; i.e., they cause no adverse effect on the substance and indicator as would alter or prevent proper functioning of the same. The shields are provided with a pull tab to facilitate removal of the shield at the time the thermometer is to be used.

Pending application, Ser. No. 300,495 filed Oct. 25, 1972 described a sterile package in which a single thermometer can be packaged in sterile condition and be maintained in such condition until the thermometer is required for use. Such package comprises an envelope of first and second flat strips of material having vapor impervious and heat sealable character which are heat sealed together in a continuous heat seal course encircling the thermometer, the thermometer having a two component shield means therein. The shield includes a pull tab thereon with which peeling removal of the shield is initiated, the pull tab of each separate shield component employed in the thermometer being anchored within and to the envelope at one end of the latter. To remove the thermometer from the package, the envelope is opened at the other end thereof and the thermometer is removed from the envelope by pulling force applied to the thermometer, such pulling action effecting removal of the shield components within the package during course of the thermometer removal from the package. During removal of the thermometer from the package, a presser comb unit presses the operative elements in the indicating end of the thermometer into operative communication.

The separator shield means described in U.S. Pat. No. 3,712,141 is a two component shield means, it has a separator shield component being associated each with the thermally responsive substance and the indicator means. These separator shield components are each an elongated length of flexible material folded on itself in at least one fold along a fold line such that there is a first shield segment coextensive with the thermometer part (strip) carrying the thermally responsive substance and the thermometer part carrying the indicator means, and a second shield segment coextensive with the first segment. The first segment of the shield associated with the indicator means is peelably removably secured to the associated thermometer strip by adhesion to an adhesive carrying face of the strip, which adhesive is of a type as permits ready removal of the shield. The shield component associated with the thermally responsive substance on the other hand and as is described more fully in U.S. Pat. No. 3,712,141 is secured to the thermally responsive substance carrying part (strip) of the thermometer by means of a heat sealed connection therewith. The removal of this latter shield component thus involves application of a greater pulling force to remove same than is necessary for removing the shield component associated with the indicator means. When the thermometer provided with such shield means is packaged in the sterile package described in pending application, Ser. No. 300,495 because of the relatively flat nature of the package, the lengths of the two thermometer strips carrying the indicator means and thermally responsive substance do not have sufficient room therein to separate from each other to any appreciable degree to enable the shield component which is heat sealed to the thermometer to peel off therefrom except in a manner in which the application of pulling force is confined to a direction almost parallel with the thermometer strip - meaning that there is little pulling force component directed normal to such strip. It is desirable therefor that in such a package, means be provided to maintain an open loop separation between the folded shield segments of the shield means associated with the thermally responsive substance so the removal of the shield induces at the fold line a certain magnitude of pulling force component which extends normal to the thermometer strip. In this manner a force required to break the heat sealed bond between the shield component and the thermometer strip is enlarged for a given pulling force applied to the shield component thereby increasing the ease with which such shield component can be removed.

SUMMARY OF THE INVENTION

The present invention is concerned with an improved package for storage and dispensing of a disposable chemical type thermometer It is particularly concerned with providing means to facilitate removal of the separator shield from the thermometer during removal of the latter from the package. The present invention is applicable to the thermometers and shields described in U.S. Pat. Nos. 3,677,088 and 3,712,141 particularly as embodied in the sterile package described in application Ser. No. 300,495 and the description of said patents in respect of such thermometer and shield construction is incorporated by reference herein. The invention further provides improvements in the construction of the sterile package described in said application, Ser. No. 300,495.

In accordance with the present invention, a generally flat disposable type thermometer of the construction and having a shield as described in the aforementioned patent and application is packaged in an envelope of first and second elongated substantially flat strips of a material having vapor impervious and heat sealable character with the theremometer sandwiched between the strips and the strips joined together in heat seal connection at marginal areal portions of each strip in a continuous heat seal course which encircles the thermometer. The heat seal course and the vapor impervious character of the envelope strips thus provide a fully hermitically sealed enclosure in which the thermometer remains in sterile condition until required for use. Means are provided in the envelope for anchoring the thermometer shield means pull tab which extends longitudinally beyond an end of the thermometer, at one end of the envelope. Thus the pull tab of the latter, be it provided according to either of the aforementioned patents is anchored securely in one end of the envelope by means of a heat seal connection with the opposed inner faces of the envelope strips. The other end of the envelope embodies means which permit for readily opening the same. Such means desirably include a transversely weakened segment in the envelope adapted to permit severance of common longitudinal portions of each envelope strip from the remainder thereof by tearing force applied to the envelope along the weakened segment. In accordance with the present invention, the said common longitudinal portions of the envelope are fixedly secured to the thermometer so that removal of such common portions concurrently removes the thermometer from the remainder of the envelope. The movement of the thermometer from the remainder of the envelope in turn concurrently effects separation of the shield means from the strips of the thermometer to which the shield is secured. Such shield removal will be in accordance with the fuller description thereof as given in U.S. Pat. Nos. 3,677,088 or 3,712,141.

The present invention provides that to ease the removal of shield means, particularly that of the type described in U.S. Pat. No. 3,712,141 and more particularly the shield component which is heat sealed to the thermometer and requires more pulling force, means are provided for maintaining an open loop separation between the two folded segments of the shield component associated with the thermally responsive substance, at least in the region of the fold line. This induces, at said fold line during shield component removal, a certain magnitude of a pulling force component extending substantially normal to the thermometer strip to which the shield component first shield segment is connected. Accordingly, for a given pulling force applied to the shield means, a substantial portion of the same is employed to break the heat seal connection of the shield component with the thermometer strip (rather than having such pulling force applied predominantly in a direction parallel to the thermometer strip face in which event little heat seal connection breaking force would be transmitted transversely of the shield component at the intended peeling point). Desirably such means is provided as a roller loosely nested intermediate to the folded shield segments of the shield component associated with the thermally responsive substance and positioned adjacent to the fold line so as to maintain an open loop between such segments. Preferably the roller is made of a resilient material and has a roughened external surface to enhance rolling contact with said shield segments during removal of the latter.

In order to insure the proper alignment and registration of the indicator means and thermally responsive substance on the remaining length portions of the thermometer strips during the removal from the package, the envelope is provided with pressing means. These pressing means are secured to and disposed interiorly within the envelope along the course of travel of the thermometer during removal and apply a pressing force against the thermometer at a location before it exits fully from the envelope, so as to press the remaining portions of the thermometer strips into face-to-face communicative contact and assure the proper alignment of the indicator means with the thermally responsive substance.

The invention, accordingly, comprises the package and thermometer possessing the features, properties and relation of elements will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings wherein like reference numerals indicate like parts throughout and in which:

FIG. 2 is a longitudinal vertical sectional view of the sterile thermometer package and thermometer as taken along the line II—II in FIG. 1.

FIG. 4 is a longitudinal vertical sectional view on enlarged scale as taken along the line IV—IV in FIG. 3, portions of the longitudinal expanse of the package and thermometer being broken away for purposes of clarity.

FIG. 5 is a perspective view of a fragment of the package envelope and a disposable thermometer further illustrating the manner in which the shield removal roller functions during removal of the shield means.

DESCRIPTION OF THE PREFERRED EMBODIMENTS

As an initial consideration, it will be understood that the description given of the improvements provided by the present invention respecting the removal of the shield means from a disposal thermometer will be given in reference to the type of such shield means described in U.S. Pat. No. 3,712,141. Such shield means is provided as a two component shield means, one shield component being associated with the thermal responsive substance and being connected in heat-sealed connection to the remaining length portion of the thermometer strip carrying such responsive substance. The other such shield component is associated with and is adhesively secured to the adhesive bearing underface of the other thermometer strip which carries the indicator means. The shield component which is associated with the thermal responsive substance is, as earlier mentioned, heat-sealed to the thermally conductive sheet of the thermometer strip carrying the thermally responsive substance. Breaking the bond between this shield component and the thermometer strip requires more pulling force than is required to remove the other shield component. Further when the thermometer is packaged in a package of the type described in pending application, Ser. No. 300,495, there is little space in the package for the thermally responsive substance and indicator means carrying ends of the thermometer strips to separate so as to accommodate peeling removal of the shield means except in a manner in which the two folded segments of each shield component are in close superposed disposition. Accordingly in such arrangement, the force transmitted to the shield components to remove them normally would be applied, for the most part, in a direction substantially parallel with the respective shield segments. Little pulling force would be applied at the point of peeling in a direction normal to the thermometer strip. Accordingly, such pulling force would be required to be very large to effect removal of the shield component which is heat-sealed to the thermometer strip. The present invention has for one of its purposes, the provision of means to overcome the need for applying excessive pulling force to remove the shield components and particularly that associated with the thermally responsive substance. To that end the invention provides means for establishing a certain magnitude of pulling force in the shield component associated with the thermally responsive substance extending substantially normal to the thermometer strip. This enhanced pulling force component is effected at the initial point of peeling in a direction normal to the thermometer strip length, thereby easing the task of removing the shield component.

Figure 1:
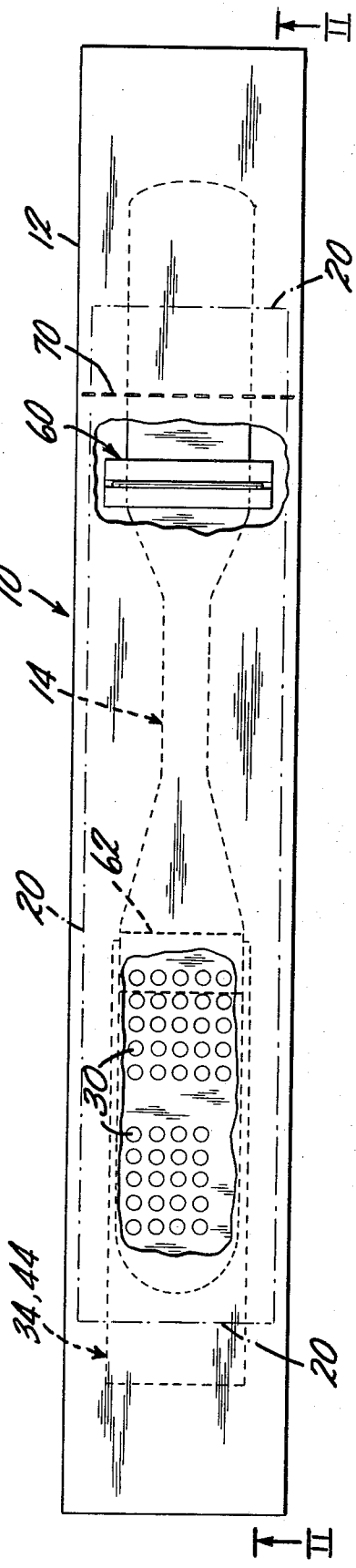
FIG. 1 is a plan view of a sterile thermometer package containing a thermometer fitted with a shield removal roller as provided by the present invention, portions of the envelope being broken away for purposes of clarity.

Referring now to FIGS. 1 and 2 in the drawings, there is depicted a thermometer package 10 which comprises an envelope 12 in which is disposed a thermometer 14, the latter being fitted with two component shield means as described in more detail in U.S. Pat. No. 3,712,141. The envelope 12 preferably is comprised of two strips 16, 18 of a material which is of a heat sealable and vapor impervious character and which strips 16, 18 are arranged in superposition with the thermometer 14 sandwiched therebetween. The two strips 16 and 18 are joined in a heat sealed connection which encircles the thermometer and which is depicted in long and short dashed lines in FIG. 1, e.g., at 20. The thermometer 14 enclosed in envelope 12 also is comprised of two elongated material strips 22 and 24 which are joined together in adhesive face-to-face contact from one tip end of each along corresponding first portions 26, 26' of the length of each strip with the remaining length portions 28 and 28' of each respectively carrying the components for indicating temperature values. Reference to U.S. Pat. No. 3,677,088 can be made for more detailed description of the thermometer construction. Thus the strip 22 carries the indicator means 30 and the strip 24 carries the thermally responsive substance 32.

The thermometer 14 also is provided with a two component shield means. The first shield component 34 is associated with the indicator means 30 and is comprised of an elongated length of flexible material folded upon itself in at least one fold along a fold line 36 proximate the juncture of the respective first length portions and remaining length portions of the two thermometer strips 22, 24 to provide a first shield segment 38 and a second shield segment coextensive with the first segment 40. The shield component 34 is heat-sealed to the package strip 16 as at 42. Similarly the shield component 44 associated with the thermally responsive substance has two folded segments 46, 48 folded along a fold line 50, the segment 48 being connected in heat-sealed connection to the face of the strip 24 in overlying relationship covering the thermally responsive substance 32, the shield component 44 in turn being heat-sealed to the envelope strip 18 as at 52. Thus both shield components 34 and 44 are anchored to the envelope 12 so that removal of the thermometer from the envelope results in concurrent peeling removal of both shield components from the thermometer.

There is also provided in the thermometer package 10 a presser or comb element 60 through which passes the thermometer. The comb element is fixed to the envelope at a location along the course of removal travel of the thermometer from the envelope for applying, at that location, a pressing force against the thermometer before it fully exits the envelope to press the remaining length portions 28, 28' of the thermometer strips 22, 24 into face-to-face contact following removal of the shield means 34, 44 therefrom and thus properly align and register the indicator means 30 and thermally responsive substance 32 in operative association. The presser means 60 is of the type described in pending application, Ser. No. 300,495.

In accordance with the invention, a roller 62 is nested intermediate the segments 46 and 48 of shield component 44 adjacent the fold line 50 thereof for the purpose of maintaining an open loop separation between segments 46 and 48 during shield component removal. Further the roller causes establishment during shield component removal, of a pulling force component of a certain magnitude extending substantially normally to the remaining length portion 28' of the thermometer strip 24 during removal of the shield component 44 to enhance the force applied at the point of peeling i.e., the fold line for rupturing or breaking the heat seal connection between the shield segment 44 and the face of the thermometer strip 24. The roller 62 desirably is made of resilient material and has a roughened exterior surface to enhance the rolling contact between the roller and the shield segments 46 and 48 during shield removal, the roller 62 rotating about its own axis in the direction shown in FIG. 2 during shield component removal.

Figure 3:
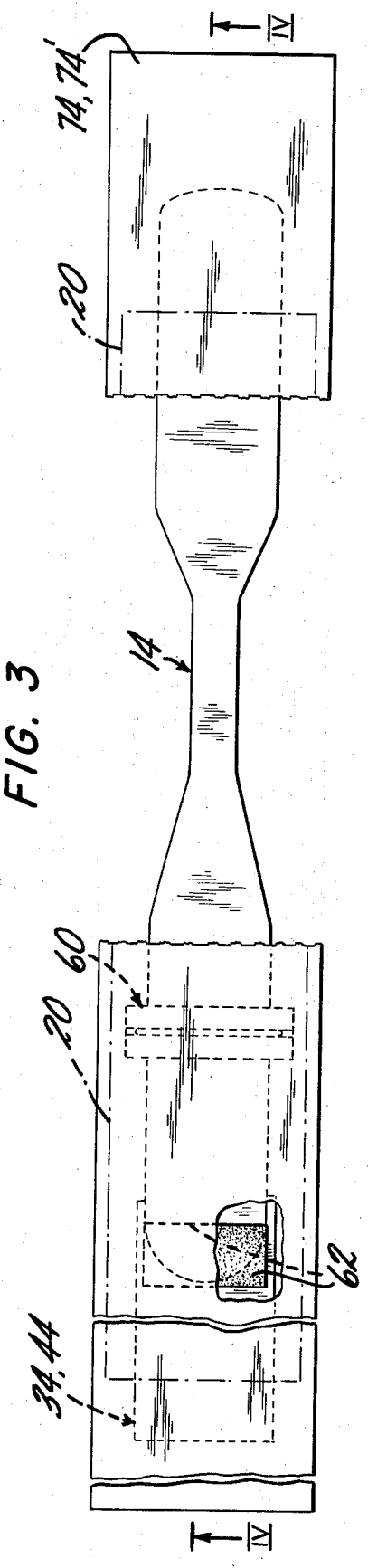
FIG. 3 is a plan view of the sterile thermometer package and thermometer shown in FIG. 1 after the package has been opened, the thermometer and shield means being shown in an intermediate position of removal of same from the envelope and thermometer, respectively, a portion of the envelope and shield being broken away in order to depict clearly the functioning of the roller during shield means removal.

Further in accordance with the invention, the envelope 12 is provided with a transversely weakened segment as at 70 adjacent the end of the envelope opposite to that at which the shield means 34, 44 are anchored, and the envelope strips 16 and 18 in the region of the transversely weakened segment 70 are heat-sealed to the thermometer at 72. Thus when it is desired to open the envelope to remove the thermometer 14 for use, the envelope 12 is opened by a rupturing or tearing of the same at the transversely weakened segment resulting in the removal of common longitudinal sections 74, 74' of the envelope strips 16 and 18 respectively, this best being seen in FIGS. 3 and 4 from which will be noted the separation of the envelope into the common longitudinal strip parts and an envelope remainder portion. Since the thermometer 14 is fixedly secured to the removed envelope strip sections 74, 74', the action of removing these strips concurrently initiates removal of thermometer from the remainder of the envelope and the peeling removal of the shield components from their disposition intervening the two thermometer strip lengths 28, 28' carrying the indicator means 30 and the thermally responsive substance 32. FIGS. 3 and 4 depict an intermediate position of removal of the thermometer 14 and shield components 34, 44 from the envelope 12 and thermometer 14 respectively. During the removal of the shield components and particularly the removal of the shield component 44 associated with the thermally responsive substance 32, the roller 62 will maintain the segments 46 and 48 of shield component 44 in an open loop separation as shown in FIG. 4. As can be best seen in FIG. 4, the roller 62 also maintains a loop segment 78 therein which is disposed substantially normal to the strip length 28' carrying the thermally responsive substance, i.e., loop segment 78 subtends an angle $\alpha$ of about 90° with strip length 28'. The foregoing thus permits for transmission through the loop segment 78 of a pulling force of a certain magnitude to cause rupture of the heat-sealed connection of the shield component segment 48 with the thermometer strip section 28'. FIG. 5 also depicts the manner in which the roller 18 rotates during shield component removal to maintain the open loop separation between the shield segments 46 and 48. As will be noted from both FIGS. 4 and 5 during the course of removal of the shield component 44, the fold line 50 between the segments moves away from the juncture of the thermometer strips 22 and 24 in the direction of the other tip ends of the latter in correspondence to the direction of applied pulling force until finally the shield component 44 is fully peeled from the thermometer strip length 28' and both the thermometer strip lengths 28, 28' enter the pressing means 60 where the remaining lengths 28, 28' are pressed into face-to-face contact, it being understood that the shield component 34 concurrently removes from the thermometer with the removal of component 44. As indicated earlier, the nature of the adhesive connection of shield component segment 38 with thermometer strip length 28 is not such as to require use of a removal roller in conjunction with removal of shield component 34 although if desired such roller also could be used for the same purpose already described.

The present invention also provides that during removal of the thermometer 14 from the envelope 12, the user need not touch the thermometer at any time since the common longitudinal portions 74, 74' of the envelope are grasped in the users hand and during pulling since they are heat-sealed to the thermometer, the hand of the user does not touch the thermometer in any way which might alter or destroy its sterile character.

Thus it will be noted from the foregoing that the present invention provides an improved disposable thermometer package as well as means in the thermometer to facilitate removal of the shield components from the latter during removal of the thermometer from the sterile package.

What is claimed is:

1. In a disposable thermometer having two elongated superimposed coextensive strips joined in adhesive face-to-face contact from one tip end of each along corresponding first portions of the length of said strip, the remaining length portions of said strips carrying component operable to detect and indicate temperature values when said remaining length portions are brought into face-to-face contact, and shield means normally intervening said remaining length portions, said shield means comprising at least one length of flexible material folded back upon itself into two segments and secured for peelable removal on its folded back segment to the remaining length portion of one of said strips so as to prevent face-to-face contact with the remaining length portion of the other strip, that segment of the shield means which is not secured to said strip extending beyond the strip end to form a pull tab for peelable removal of said shield means, the improvement comprising a roller loosely nested between the folded back segments of said shield means maintaining an open loop separation between said shield segments in the region of its fold line and operable during peelable removal of said shield to provide a pulling force component extending substantially normal to the remaining length portion of the strip to which it is secured.

2. The disposable thermometer as defined in claim 1 wherein the roller is resilient and has a roughened external surface to enhance rolling contact of the roller with the shield segments during peelable removal of the shield from the strip to which it is attached.

3. A disposable thermometer as defined in claim 1 wherein said shield means includes a second length of flexible material folded back upon itself into two segments and secured for peelable removal on its folded back segment to the remaining length portion of the second of said strips, that segment of said second length which is not secured to said second strip together with the unsecured segment of said first length defining said pull tab.

4. A thermometer package in combination with the elements of a disposable thermometer said thermometer elements having two elongated superimposed, coextensive strips joined in adhesive face-to-face contact from one tip end of each along corresponding first portions of the length of each strip, the remaining length portions of said strips carrying components operable to detect and indicate temperature values when said remaining length portions are brought into face-to-face contact, and shield means normally intervening said remaining length portions, said shield means comprising at least one length of flexible material folded back upon itself into two segments and secured for peelable removal on a folded back segment to the remaining length portion of one of said strips so as to prevent face-to-face contact with the remaining length portion of the other strip, the segment of the shield means which is not secured to said strip extending beyond the strip end to form a pull tab for peelable removal of said shield means, and a roller loosely nested between the folded back segments of said shield means maintaining an open separation between said shield segments in the region of said fold line and operable during peelable removal of said shield to provide a pulling force component extending substantially normal to the remaining length portion of the strip to which it is secured, and said envelope comprising two super-imposed sheets of vapor impervious, heat sealable flexible material sandwiching said thermometer and joined together in heat sealed connection at marginal area portions of each in a continuous heat seal course encircling said thermometer said envelope having a transversely weakened segment operable to permit tearing of the envelope along said weakened segment into two longitudinal portions said shield means pull tab being anchored to the heat sealed connection at one end of the envelope and said joined first portions of said thermometer strips being anchored to the heat sealed connection at the other end of the envelope so that separation of the two longitudinal portions of the envelope effects removal of said thermometer from one of said portions and peelable removal of said shield means, and pressing means fixedly disposed in said envelope at a location operable to apply a pressing force against the remaining length portions of the thermometer strips to bring said strips into face-to-face contact following removal of said shield means from the thermometer during separation of said envelope portions.

5. A thermometer package as defined in claim 4, wherein said shield means includes a second length of flexible material folded back upon itself into two segments and secured for peelable removal on its folded back segment to the remaining length portion of the second of said strips, that segment of said second length which is not secured to said second strip, together with the unsecured segment of said first length defining said pull tab.

6. A thermometer package as defined in claim 4 wherein the roller is of a resilient material and has a roughened external surface to enhance rolling contact of the roller with the shield segments during peelable removal of the shield from the strip to which it is attached.

* * * * *